United States Patent [19]

Fabian

[11] 3,880,890

[45] Apr. 29, 1975

[54] MANUFACTURE OF 3,4,9,10-PERYLENETETRACARBOXYLIC ACID DIANHYDRIDE PIGMENTS HAVING HIGH TINCTORIAL STRENGTH

[75] Inventor: Wolfgang Fabian, Wilhelmsfeld, Germany

[73] Assignee: BASF Aktiengesellschaft, Ludwigshafen (Rhine), Germany

[22] Filed: Oct. 23, 1973

[21] Appl. No.: 408,418

[30] Foreign Application Priority Data
Oct. 24, 1972 Germany.......................... 2252041

[52] U.S. Cl........................... 260/345.2; 116/288 Q
[51] Int. Cl................................................ C07d 7/46
[58] Field of Search ................................. 260/345.2

[56] References Cited

UNITED STATES PATENTS 3,775,434   11/1973   Spietschka et al.............. 260/345.2

Primary Examiner—John M. Ford

[57] ABSTRACT

Process for the manufacture of perylene-3,4,9,10-tetracarboxylic acid dianhydride pigment having high tinctorial strength, in which the raw pigment, which has been ground dry and which has an average primary particle size of between 0.01 and 1 $\mu$, is treated with 80 to 95 percent strength by weight sulfuric acid until the pigment displays optimum tinctorial strength. A high tinctorial strength red pigment which has a very pure color shade and can be dispersed very readily, is obtained.

4 Claims, No Drawings

MANUFACTURE OF 3,4,9,10-PERYLENETETRACARBOXYLIC ACID DIANHYDRIDE PIGMENTS HAVING HIGH TINCTORIAL STRENGTH

The invention relates to a process for the manufacture of high tinctorial strength pure pigments consisting of 3,4,9,10-perylenetetracarboxylic acid dianhydride, in which the raw pigment is finely ground whilst dry and the ground product is treated with 80 to 95% strength sulfuric acid.

German Patent Specification 1,241,605 (Example 1) discloses a process for the manufacture of 3,4,9,10-perylenetetracarboxylic acid dianhydride pigments in which powdered raw pigment is stirred in sulfuric acid of a certain concentration, at room temperature. The mixture is then poured into water and the precipitate is filtered off, washed until neutral, dried and powdered. The specified sulfuric acid concentration is 94 to 88%. The 3,4,9,10-perylenetetracarboxylic acid dianhydride pigments obtainable by this process are not always entirely satisfactory in respect of tinctorial strength, purity of shade and dispersibility.

We have now found that 3,4,9,10-perylenetetracarboxylic acid dianhydride pigments of improved purity of color shade and high tinctorial strength are obtained by treating powdered raw pigment with sulfuric acid, if a raw pigment which has been ground dry, optionally in the presence of solid grinding aids, and which has an average primary particle size of between 0.01 and $1\mu$, is treated with 80 to 95 percent strength by weight sulfuric acid until the pigment has acquired optimum tinctorial strength.

The starting material for the process of the invention is technical-grade 3,4,9,10-perylenetetracarboxylic acid dianhydride (hereinafter also referred to as raw pigment) as obtainable by conventional processes, for example by fusion of naphthalic acid with alkali. The dry raw pigment is finely ground until its primary particle size reaches an average value of 0.01 to $1\mu$, preferably 0.01 to $0.1\mu$. The grinding operation can be carried out in, for example, ball mills, vibration mills or attrition mills or other comminution equipment conventionally used for finely grinding pigments, and conventional types and amounts of suitable solid grinding aids, for example inorganic or organic salts, can also be present. preferably, the pigment is ground in ball mills or vibration mills, using iron balls 0.1 to 3 cm in diameter, and without the use of grinding aids. The brown or brownish black powder thus obtained, which is largely agglomerated and, in this form, is of inadequate tinctorial strength and inadequate purity for use as a pigment, is then treated with sulfuric acid of 80 to 95, preferably 87 to 92, per cent concentration by weight until the pigment has acquired optimum tinctorial strength. This can be ascertained rapidly and easily by taking a sample, grinding it with varnish and brushing out the paint obtained. In general, the tinctorial strength is optimum when the treatment has increased the average particle size of the pigment to about twice to five times the average primary particle size of the ground material. The particle size growth can be followed readily under the microscope. Suitable ways of carrying out the treatment are by stirring, shaking or kneading the pigment powder in sulfuric acid, or simply letting the pigment powder stand in sulfuric acid, at temperatures of 10° to 100°C, and preferably at room temperature.

The prime factor which determines the tinctorial quality of the pigment which can be obtained is the concentration of sulfuric acid used. Lower concentrations give yellowish-tinged shades of red and higher concentrations give bluish-tinged shades of red. The amount of sulfuric acid used is advantageously 1.5 to 20 times, and preferably 3 to 10 times, the amount by weight of the pigment employed. A lower limit is imposed on the amount of sulfuric acid by the need to be able to knead or stir the mixture before, during and after the treatment. If the pigment is ground in the presence of grinding aids it is as a rule not necessary to remove the latter prior to the treatment with sulfuric acid.

After the treatment with sulfuric acid, the mixture is worked up in a conventional way, for example by introducing it into water, separating off the precipitate and washing and drying the pigment. A red pigment of good fastness to light and to weathering, high tinctorial strength, excellent purity of shade and outstanding dispersibility is obtained; in the dispersed form, the average particle size of the pigment is approximately from two to five times the particle size of the raw pigment after grinding.

The pigment can then be powdered and used for conventional pigmentation purposes. It is particularly suitable for use in the manufacture of lacquers, such as nitro lacquers, cellulosic lacquers, polyester resin lacquers, epoxy resin lacquers, silicone resin lacquers and alkyd resin lacquers, but above all baking finishes, for the manufacture of printing inks, including offset inks, and for coloring plastics, such as polyvinyl chloride, polyethylene, polystyrene, polyurethane and polyamide, and polymer dispersions.

In the examples given below, the parts and percentages specified are by weight.

EXAMPLE 1

400 g of 3,4,9,10-perylenetetracarboxylic acid dianhydride are shaken for 24 hours in a 4 liter vibration mill filled with 3.5 kg of iron balls 1 to 2.5 cm in diameter. This converts the initially reddish powder into a fine brownish powder having a metallic surface gloss, an increased bulk density and an average particle size of 0.01 to $0.05\mu$.

400 parts of the 3,4,9,10-perylenetetracarboxylic acid dianhydride ground in this way are introduced into 4,000 parts of 90% strength sulfuric acid and the mixture is stirred for 16 hours at room temperature. During this time, the appearance of the suspension changes from brown to clear red and the viscosity increases at the same time. The syrupy mixture is poured into 8,000 parts of water and the pigment is filtered off, washed until neutral and dried. The average particle size is 0.05 to $0.1\mu$.

When powdered and worked into linseed oil or nitrolacquers, the pigment gives strong pure red colorations of outstanding fastness to light and to weathering.

If 86% strength sulfuric acid is used instead of 90% strength sulfuric acid, whilst otherwise following the same procedure, a pigment which is equally pure but of a yellower tint and has an approx. 5% higher tinctorial strength is obtained.

EXAMPLE 2

40 parts of 3,4,9,10-perylenetetracarboxylic acid dianhydride which has first been ground as described in Example 1 are kneaded with 80.0 parts of 86% strength sulfuric acid in a kneader for 10 hours. The crumbly red mass is stirred with 1,000 parts of water at 40° to 80°C and the pigment is filtered off whilst hot, washed until neutral and dried. When worked into a lacquer or varnish, the pigment gives pure red pigmentations of high tinctorial strength.

EXAMPLE 3

200 g of 3,4,9,10-perylenetetracarboxylic acid dianhydride and 200 g of sodium sulfate are shaken for 24 hours in a 4 liter vibration mill filled with 3.5 kg of iron balls 1 to 2.5 cm in diameter. The balls are separated off. 200 parts of the ground material is stirred with 3,000 parts of 90% strength sulfuric acid for 16 hours at room temperature. The mixture is poured into 30,000 parts of water at 60° to 80°C and the product is filtered off, washed until neutral and free of salt and dried in a circulating air drying oven at 60°C. The resulting pigment displays a particularly pure color shade.

I claim:

1. An improved process for the manufacture of 3,4,9-,10-perylenetetracarboxylic acid dianhydride pigments by treating powdered raw pigment with sulfuric acid, wherein the improvement consists in treating a raw pigment which has been ground dry, optionally in the presence of solid grinding aids, and which has an average primary particle size of between 0.01 and 1$\mu$, with 80 to 95 percent strength by weight sulfuric acid at 10° to 100°C until the pigment has acquired optimum tinctorial strength.

2. A process as claimed in claim 1, wherein raw pigment which has been ground in a ball mill or vibration mill with iron balls 0.1 to 3 cm in diameter is treated with sulfuric acid.

3. A process as claimed in claim 1, wherein the treatment with sulfuric acid is carried out at room temperature.

4. A process as claimed in claim 1, wherein the treatment is carried out with 87 to 92 percent strength by weight sulfuric acid.

* * * * *